United States Patent
Gong et al.

(10) Patent No.: US 11,045,952 B2
(45) Date of Patent: Jun. 29, 2021

(54) SYSTEM AND METHOD FOR AUTONOMOUSLY LOADING CARGO INTO VEHICLES

(71) Applicant: BITO Robotics, Inc., Pittsburgh, PA (US)

(72) Inventors: Chaohui Gong, Pittsburgh, PA (US); Ariana Keeling, Pittsburgh, PA (US)

(73) Assignee: BITO Robotics, Inc., Pittsburgh, PA (US)

( * ) Notice: Subject to any disclaimer, the term of this patent is extended or adjusted under 35 U.S.C. 154(b) by 0 days.

(21) Appl. No.: 16/693,605

(22) Filed: Nov. 25, 2019

(65) Prior Publication Data

US 2020/0164510 A1    May 28, 2020

Related U.S. Application Data

(60) Provisional application No. 62/772,161, filed on Nov. 28, 2018.

(51) Int. Cl.
*B25J 9/16* (2006.01)
*B65G 67/04* (2006.01)
*B25J 13/08* (2006.01)

(52) U.S. Cl.
CPC ............. *B25J 9/1661* (2013.01); *B25J 9/162* (2013.01); *B25J 9/1612* (2013.01); *B25J 9/1633* (2013.01); *B25J 9/1697* (2013.01); *B25J 13/081* (2013.01); *B65G 67/04* (2013.01); *B65G 2203/0216* (2013.01); *B65G 2203/044* (2013.01)

(58) Field of Classification Search
CPC ........ B25J 9/1661; B25J 9/1612; B25J 9/162; B25J 9/1697; B25J 13/081; B65G 67/04; B65G 2203/0216; B65G 2203/04; G01C 21/00
See application file for complete search history.

(56) References Cited

U.S. PATENT DOCUMENTS 9,227,323 B1 *   1/2016   Konolige ................. G06T 7/60
9,610,830 B2 *   4/2017   Orton .................... E05F 15/676
(Continued)

OTHER PUBLICATIONS

PCT Application PCT/US2019/063508; International Search Report and Written Opinion of the International Searching Authority; dated Feb. 3, 2020.

*Primary Examiner* — Kaitlin S Joerger
(74) *Attorney, Agent, or Firm* — Jones Day

(57) ABSTRACT

Systems and methods are provided for autonomously loading cargo into a vehicle. Cargo is stacked into a storage apparatus of an autonomous mobile robot in a pre-loading configuration based on a predetermined loading configuration. A signal is received indicating a location of the vehicle to be loaded with the cargo. The robot autonomously navigates to the location of the vehicle. The robot scans one or more fiducial marks located on a first piece of cargo in the storage apparatus with an imaging sensor, wherein the fiducial marks are configured to communicate one or more manipulation points of the first piece of cargo when scanned. The robot manipulates the first piece of cargo at the manipulation points and loads the first piece of cargo into the designated area of the vehicle. The robot repeatedly scans and manipulates a next piece of cargo until a predetermined amount of cargo has been loaded into the designated area.

23 Claims, 7 Drawing Sheets

(56) References Cited

U.S. PATENT DOCUMENTS

| | | | |
|---|---|---|---|
| 9,707,682 B1* | 7/2017 | Konolige | B25J 9/162 |
| 10,471,595 B2* | 11/2019 | Tan | B25J 19/023 |
| 10,493,629 B2* | 12/2019 | Jain | B25J 9/1612 |
| 10,576,630 B1* | 3/2020 | Diankov | B25J 13/02 |
| 10,583,560 B1* | 3/2020 | Rodrigues | B65G 1/137 |
| 10,754,350 B2* | 8/2020 | Russell | G05D 1/0246 |
| 2008/0167817 A1* | 7/2008 | Hessler | G01C 21/005 |
| | | | 701/514 |
| 2013/0186999 A1 | 7/2013 | Huber | |
| 2014/0251556 A1 | 9/2014 | Orton | |
| 2016/0047646 A1 | 2/2016 | Ochsendorf et al. | |
| 2016/0221187 A1 | 8/2016 | Bradski et al. | |
| 2017/0357270 A1 | 12/2017 | Russell | |
| 2018/0093377 A1* | 4/2018 | Bradski | G06T 7/529 |
| 2018/0215545 A1* | 8/2018 | High | G06Q 10/087 |
| 2019/0263590 A1* | 8/2019 | Luckay | G06Q 50/32 |
| 2020/0078938 A1* | 3/2020 | Bradski | G06K 9/4661 |
| 2020/0238519 A1* | 7/2020 | Diankov | G01S 17/89 |

\* cited by examiner

SYSTEM AND METHOD FOR AUTONOMOUSLY LOADING CARGO INTO VEHICLES

CROSS-REFERENCE TO RELATED APPLICATIONS

This application claims priority to U.S. Provisional Application No. 62/772,161, filed Nov. 28, 2018, entitled "System and Method for Autonomously Loading Cargo Into Vehicles," which is incorporated herein by reference in its entirety.

TECHNICAL FIELD

The subject matter described herein relates to autonomous guided vehicles and more particularly to loading cargo through the use of autonomous guided vehicles (AGVs).

BACKGROUND

The modern economy is largely dependent on the transportation of goods, requiring vast quantities of cargo to be loaded into vehicles every year. Grocery stores now offer curbside grocery retrieval services, where consumers order groceries in advance to be picked up and loaded into their vehicles upon arrival. Package delivery companies retrieve ordered goods from manufacturers or vendors and deliver them to customers' doors. Food service industries load food into small passenger vehicles or vans for delivery. In each situation, an employee or volunteer is required to load the cargo into the vehicle. Loading cargo manually can decrease speed and efficiency of operation, particularly in automated factories where the production and transportation of goods relies heavily on AGVs (e.g., automated guided vehicles; robots) and fully autonomous machinery.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Systems and methods described herein include AGV cargo loading systems that utilize an autonomous mobile loading robot. The loading robot can travel from a staging/pre-loading position to loading destinations with cargo therein or in tow and autonomously load the cargo into a vehicle based upon a cargo placement plan. The placement plan can be predetermined based upon a known make and model of the vehicle, and/or can be formed or adjusted based upon a scan of the area of the vehicle to be loaded.

Figure 1:
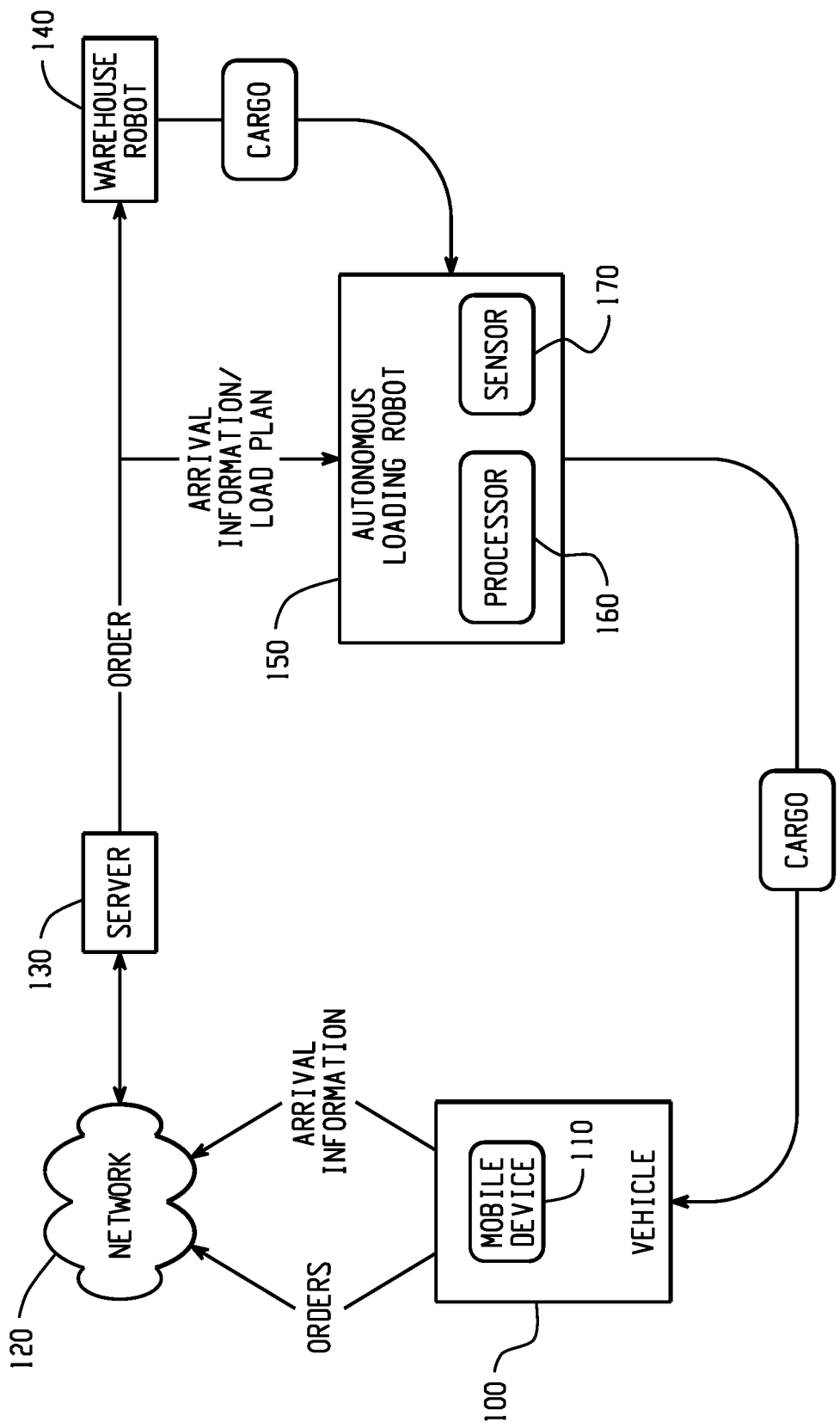
FIG. 1 illustrates a schematic of a system for autonomously loading a vehicle with cargo.

FIG. 1 depicts a schematic of a system for autonomously loading a vehicle with cargo. A vehicle 100 (e.g., a consumer car, a semi-truck) is associated with placing an order for cargo. In one embodiment, a mobile device 110 associated with the vehicle 100 or a driver of the vehicle 100 is used to place the order. A network 120 receives the order (e.g., from the mobile device 110 or other network entity) along with order-specific arrival information. Potential arrival information can be, for example, the make and model of the car to be loaded, a desired time of cargo pick-up, a parking spot ID number, a geolocation indicator (e.g., RFID tag, internal GPS device), or various other identifiers. A server 130 retrieves and stores the order and arrival information from the network 120, where it can be accessed by destination entities, such as warehouse robots 140 and autonomous loading robots 150.

In certain embodiments, the server 130 can communicate loading information with the network 120 and, indirectly, the mobile device 110 and vehicle 100. In embodiments where a vehicle does not have a geolocation indicator or any other location information, the server 130 may communicate an assigned parking spot or loading zone for pick-up. Further, in embodiments where a pick-up time is not established or where the system is unable to load at the requested time, a server 130 may relay a wait time or suggested time for arrival to the vehicle.

In an embodiment, once the order and arrival information is stored on the server 130, one or more warehouse robots 140 can access the order and compile the requested cargo. In some embodiments, the entire process from requesting an order to loading the vehicle is autonomous. In an alternative embodiment, human workers at a warehouse can interpret the order and compile the requested cargo.

The compiled cargo is then transported to the loading robot 150. In certain embodiments, the warehouse robot 140 and the loading robot 150 are in the same location. In other embodiments, the warehouse is separate from the loading location. The cargo may be transported to the loading robot 150 in various ways, such as by the warehouse robots 140, by other AGVs, or with the assistance of human workers.

Meanwhile, one or more autonomous loading robots 150 assigned to the order can retrieve the arrival information and determine a cargo placement plan. In one embodiment, a processor 160 can utilize the arrival information (e.g. vehicle 100 make and model) and run a loading algorithm to determine the placement plan based on expected dimensions in an expected cargo holding area of the vehicle 100. The processor 160 can be an internal device within the loading robot 150 or external. In an alternative embodiment, the loading algorithm is run on the server 130 and the predetermined cargo placement plan is communicated to the autonomous loading robot 150 thereafter.

In certain embodiments, the algorithm can take into account cargo size, contents, and other information extracted from the order details, as well as information regarding the pick-up vehicle (e.g., make and model). The loading algorithm then returns a cargo placement plan to the processor 160 with an optimized cargo configuration for the designated area of the vehicle to be loaded. In an embodiment, the loading algorithm comprises a compilation of vehicle specifications for various makes and models of vehicles. In instances where the make and model of the vehicle is known, the cargo placement plan can be specifically designed to fit the dimensions of a designated area of the vehicle (e.g., the vehicle's trunk) based on its retrieved specifications.

Next, the loading robot 150 is loaded with the requested cargo compiled and delivered by the warehouse robots 140. In an embodiment, the cargo can be stacked in a configuration based on the predetermined loading configuration from the cargo placement plan. For example, the cargo may be stacked in a last-in-first-out configuration so that the last piece of cargo stacked into the loading robot is the first piece of cargo loaded into the vehicle.

Once the vehicle 100 has arrived, the loading robot 150 in certain embodiments loads the cargo into the designated area of the vehicle 100 based on the predetermined cargo configuration from the placement plan. In some embodiments to be discussed further below, the loading robot 150 uses an imaging sensor 170 to scan the interior of the vehicle 100, and adjusts the placement plan based on the detected volume (e.g., based on detected obstacles). In such embodiments, the cargo is placed into adjusted positions based upon the results of the scan.

Figure 2:
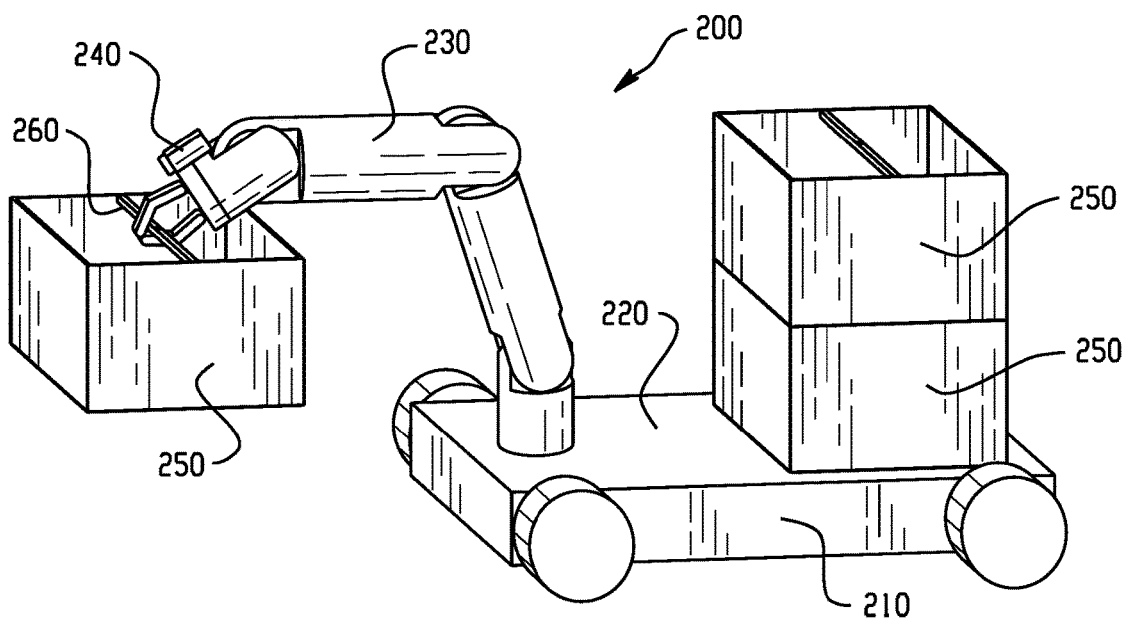
FIG. 2 illustrates an autonomous loading robot with a flat platform storage apparatus and a robot arm manipulator.

FIG. 2 depicts an embodiment of the aforementioned loading robot. Loading robot 200 comprises an autonomously guided vehicle platform 210, a storage apparatus 220, a manipulator 230, and one or more sensors 240. The vehicle platform 210 is configured to autonomously navigate to a location of a vehicle to be loaded with cargo 250 in response to a signal communicating the vehicle's location. In the depicted embodiment, the vehicle platform 210 comprises four wheels, though alternative embodiments may comprise more or less wheels, or no wheels. The vehicle may also be configured to transition via a track, continuous track surfaces, legs, etc.

The storage apparatus 220 is configured to hold one or more pieces of cargo 250. In the depicted embodiment, the storage apparatus 220 is a flat platform, configured to store cargo 250 in a stacked configuration. In alternative embodiments, the storage apparatus may be a conveyor, one or more bins, a rail system, a carousel system as discussed in reference to FIG. 3 below, or any other configuration or system able to receive one or more pieces of cargo. As mentioned above, the cargo can be pre-loaded into the storage apparatus in a configuration that facilitates loading the vehicle according to a cargo placement plan. For example, the cargo may be stacked in a last-in-first-out configuration so that the last piece of cargo stacked into the loading robot is the first piece of cargo placed in the vehicle.

Referring again to FIG. 2, the manipulator 230 comprises a mechanism for loading cargo into a vehicle. In the embodiment pictured, the manipulator 230 is mounted on the loading robot 200 and comprises a multi-degree-of-freedom robot arm configured to grip, transport, and release cargo 250. In alternative embodiments, the robot arm could end with a bucket, configured to scoop up and transport the cargo in a way similar to an excavator. Or, the manipulator can be a forklift, a gantry robot as discussed in reference to FIG. 4 below, or any other means for transporting cargo. Additionally, the manipulator could be a mechanism designed specifically for handling the kind of cargo to be loaded.

The manipulator 230 also comprises one or more sensors 240. The sensors 240 can include an imaging sensor capable of scanning both the vehicle to be loaded and the cargo. In alternative embodiments, the sensors 240 can also comprise touch and proximity sensors. The sensors 240 can be located on a different component of the loading robot other than the manipulator as pictured, such as the vehicle platform.

In one embodiment, an imaging sensor scans the cargo before loading. Each piece of cargo comprises one or more fiducial marks that, when scanned, convey distinguishing features of the respective piece of cargo to the loading robot. One such feature can be the manipulation point(s) of the cargo, which can detail how and where the cargo should be picked up by the manipulator for loading. For example, as depicted in FIG. 2 where the cargo comprises a handle 260, a scan of the fiducial marks may determine that the robot arm manipulator 230 should grasp the cargo 250 by the handle 260 for transport. Alternatively, if the cargo is irregularly shaped or must maintain a certain orientation when transported, a scan of the fiducial marks will convey specialized manipulation points to the loading robot that meet such loading requirements and are compatible with the type of manipulator employed. As discussed further below in reference to FIG. 5, the fiducial marks can convey other types of cargo features, and can be QR-codes, barcodes, or any other tag configured to convey information.

Figure 3:
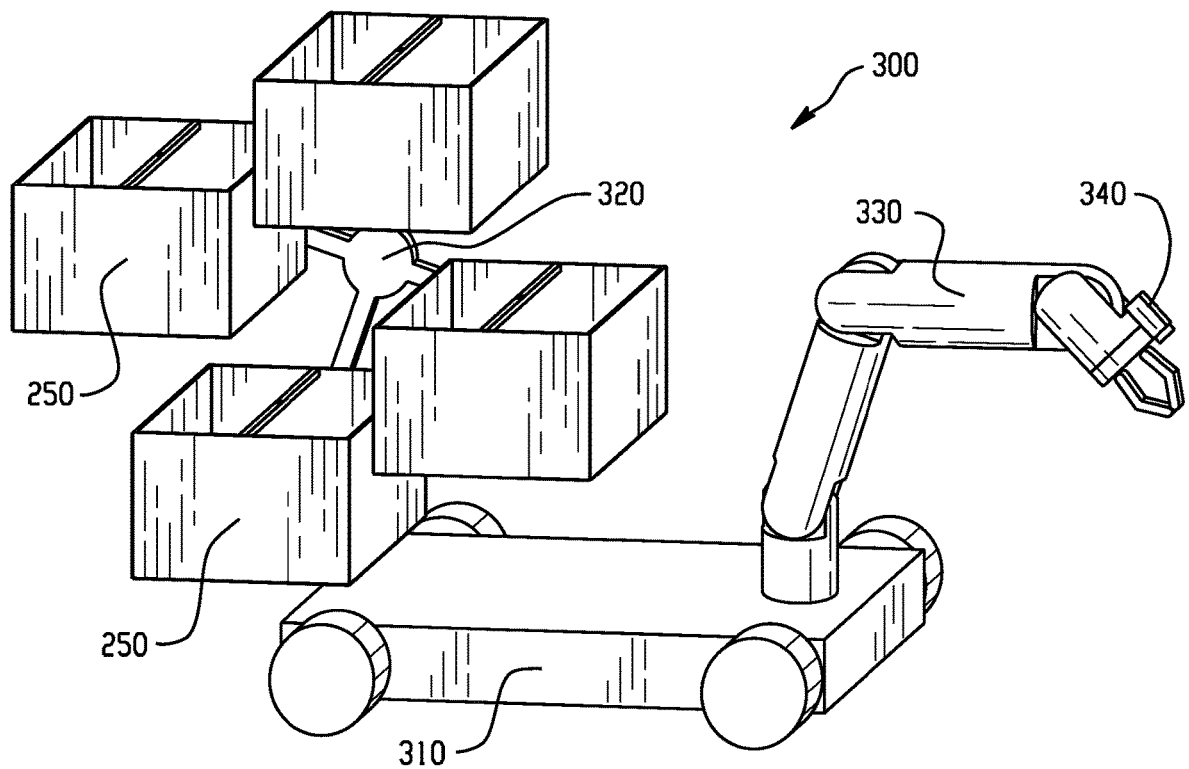
FIG. 3 illustrates an autonomous loading robot with a carousel storage apparatus and a robot arm manipulator.

An alternative embodiment of a loading robot with a vertical carousel storage apparatus is depicted in FIG. 3. The loading robot 300 comprises a storage apparatus 320 configured to rotate both towards and away from the manipulator 330 in a "Ferris wheel"-like fashion. Rotation can be via a motor, or other mechanical or electrical means. In the pictured embodiment, rotation of the storage apparatus 320 can be controlled by a processor either internal or external to the loading robot 300, where the processor is configured to stop and start rotation and vary rotation speed and direction. Though the FIG. 3 embodiment is configured to store four pieces of cargo 250, alternative embodiments may hold more or less cargo 250. The loading robot 300 also comprises a vehicle platform 310, robot arm manipulator 330, and sensors 340 which function substantially the same as the vehicle platform 210, manipulator 230, and sensors 240 described in reference to FIG. 2 above.

Figure 4:
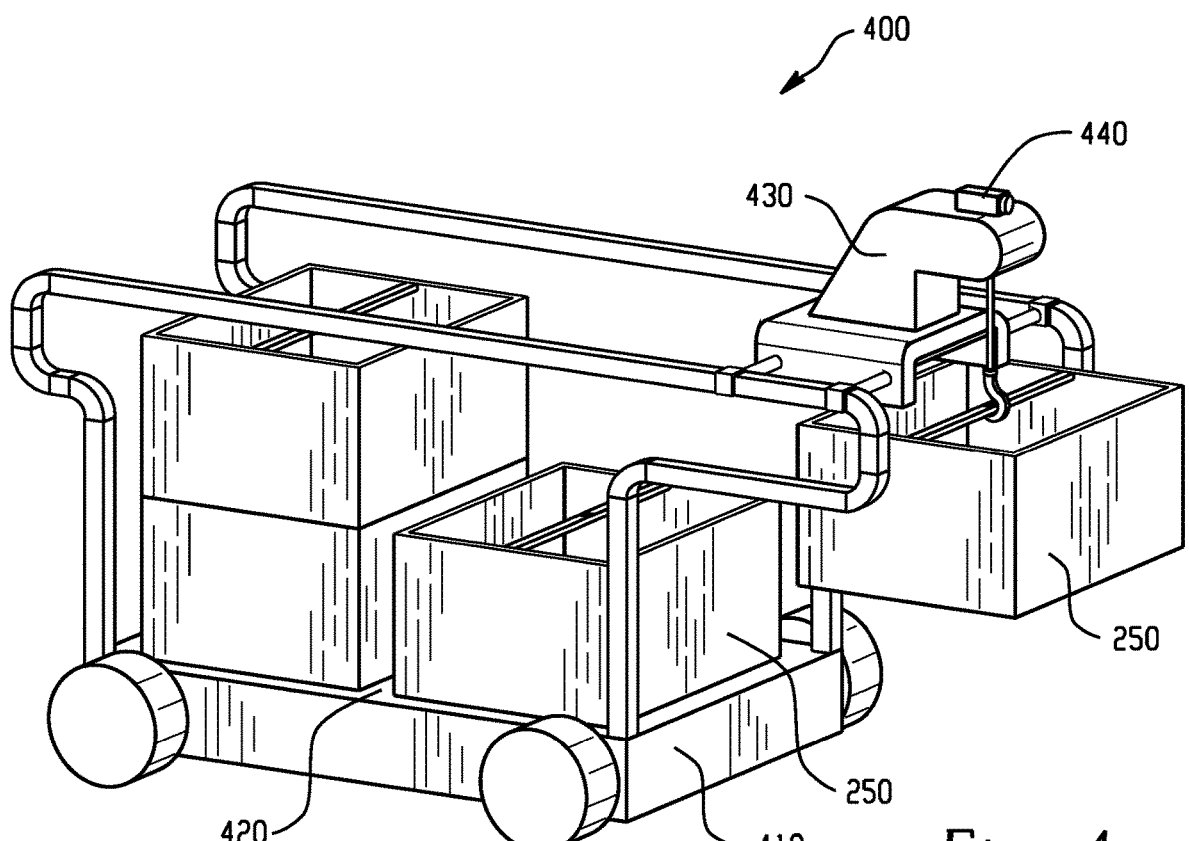
FIG. 4 illustrates an autonomous loading robot with a flat platform storage mechanism and a gantry robot manipulator.

Another alternative embodiment of a loading robot is depicted in FIG. 4. The loading robot 400 comprises a gantry robot manipulator 430, configured to load one or more pieces of cargo 250 into a vehicle. In the pictured embodiment, twin rails run the length of the loading robot 400 with a gantry robot manipulator 430 mounted between the rails. The rails extend beyond the front of the loading robot so that the robot may position itself over a designated area to be loaded and lower the cargo into its proper placement.

In the depicted embodiment, cargo 250 is stacked on a flat platform storage apparatus 420, which functions substantially the same as storage apparatus 220 described above. The gantry robot manipulator 430 can travel along the rails and position itself over a piece of cargo 250. The manipulator 430 can then retrieve and transport the cargo 250 over a designated area of the vehicle to be loaded and lower the cargo 250 into the vehicle based upon a cargo placement plan. In the pictured embodiment, the gantry robot employs a pulley mechanism, though a multi-degree-of-freedom robot arm could also be used to increase versatility in loading configurations. In addition, the proportions of the rail system can be adjusted in alternative embodiments to better accommodate vehicle dimensions as needed. The loading robot 400 also comprises a vehicle platform 410 and sensors 440, which function substantially the same as the vehicle platform 210 and sensors 240 described in reference to FIG. 2.

Figure 5:
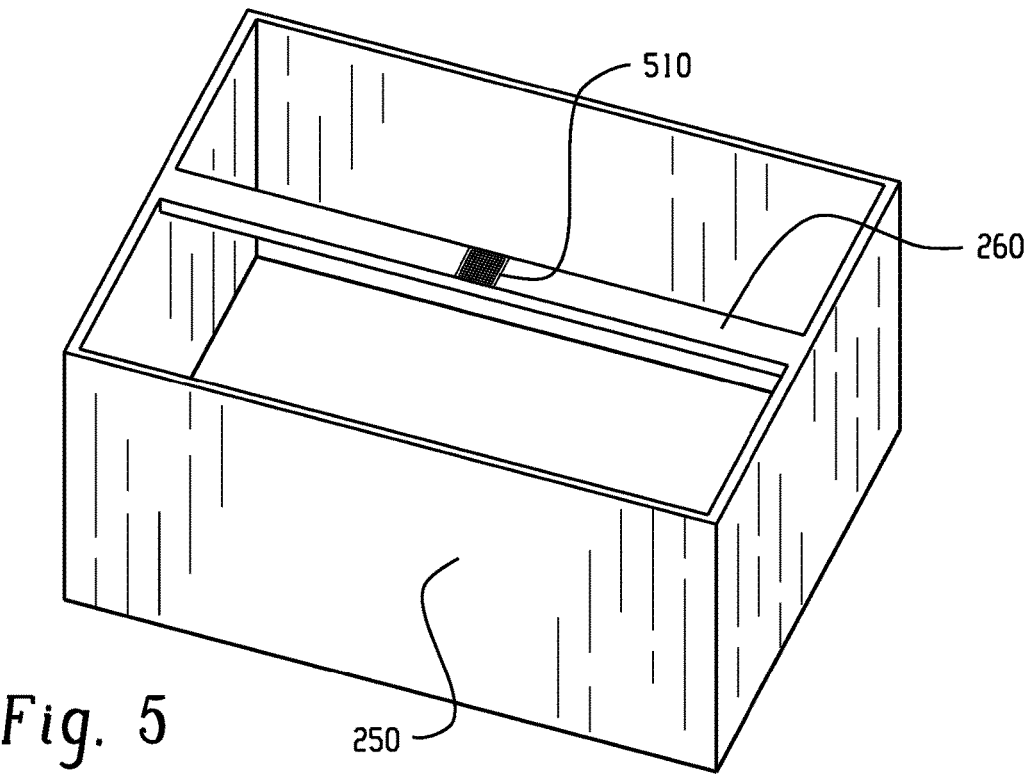
FIG. 5 illustrates a fiducial mark on a piece of cargo.

As mentioned above, in certain embodiments each piece of cargo comprises one or more fiducial marks. Fiducial marks can be QR-codes, barcodes, or any other tag configured to convey information. FIG. 5 depicts a single fiducial mark 510 on the handle 260 of a piece of cargo 250. When scanned, a fiducial mark conveys distinguishing features of the respective piece of cargo to the loading robot, including manipulation points as detailed above. In embodiments, fiducial marks can be configured to convey the weight of a piece of cargo, its contents, its orientation, whether or not the cargo is fragile, or any other desired feature. In the FIG. 5 embodiment, the fiducial mark 510 is on a handle 260, but in alternative embodiments the fiducial mark(s) may be located anywhere on a piece of cargo and the cargo may or may not have one or more handles. In the example of FIG. 5, the fiducial mark 510 conveys that the gripping point is handle 260 and that the fiducial mark 510 is at the center point of the handle. The loading robot scans the fiducial mark 510 and accesses a database or table either local or remote to ascertain the meaning of the fiducial mark 510. The loading robot then adjusts its handling of the piece of cargo 250 (e.g., grips at the handle 260 at an appropriate gripping point) based on the determined meaning of the mark.

Figure 6:
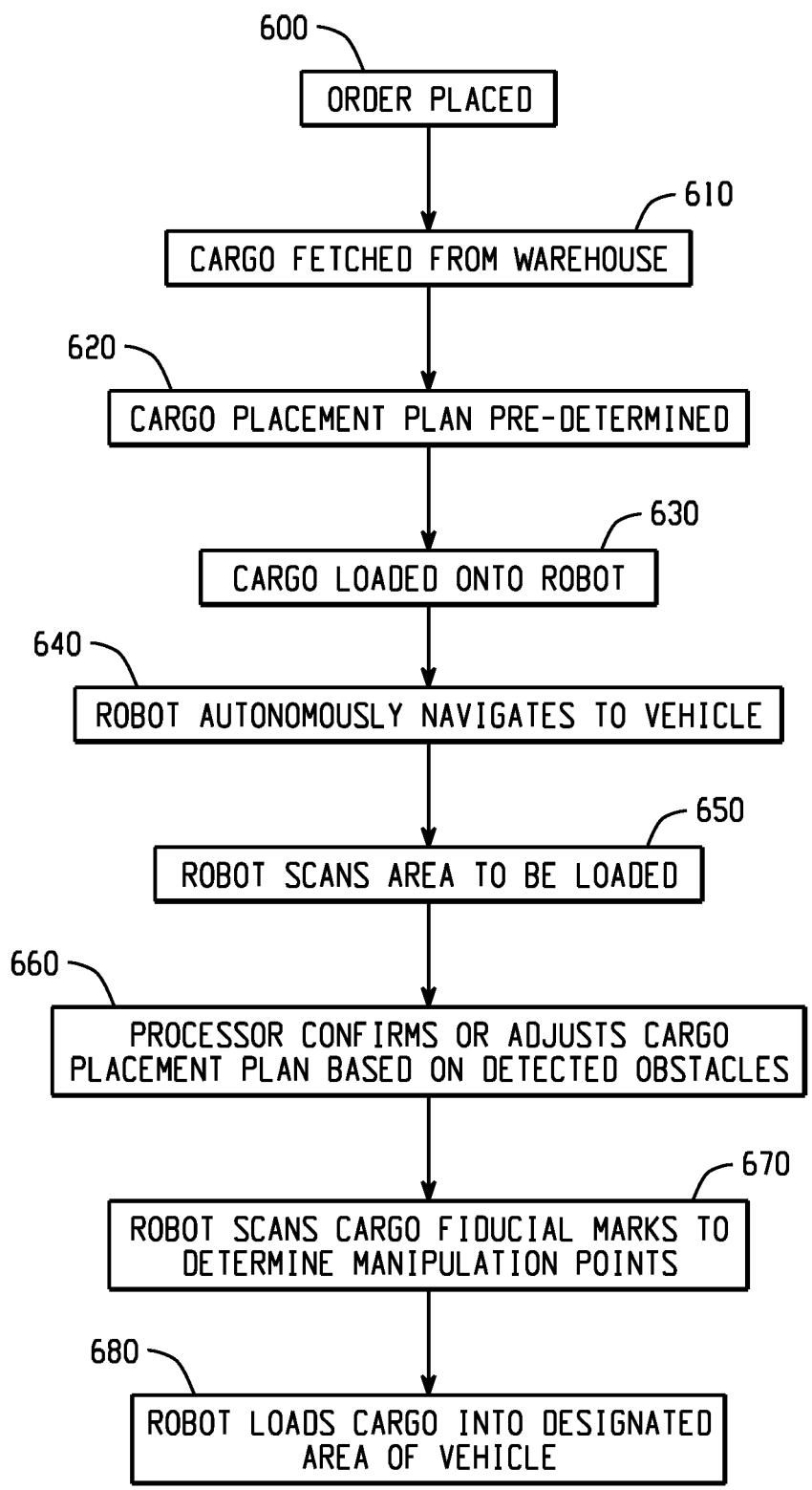
FIG. 6 illustrates an implementation of a method for autonomously loading a vehicle with cargo, starting with placing an order for cargo and ending once the loading is complete.

FIG. 6 depicts an implementation of a method for autonomously loading a vehicle with cargo, starting with placing an order for cargo and ending once the loading is complete. First, an order for cargo is placed at 600. The order may be placed on a computer, via an application on a mobile phone, by phone call, in person, or by another means of communication. Then, the ordered cargo is fetched from a warehouse at 610. As mentioned above, the cargo may be compiled and transported to the loading robot by warehouse robots in a completely autonomous system, or by human workers.

Next, or simultaneous with 610, a cargo placement plan is determined at 620. As mentioned above, the robot's processor can run a loading algorithm configured to consider order details and any arrival information to establish the placement plan. In certain embodiments, the algorithm can take into account cargo size, contents, and other information extracted from the order details, as well as information regarding the pick-up vehicle (e.g., make and model). The loading algorithm then returns a cargo placement plan to the loading robot with an optimized cargo configuration for the vehicle to be loaded. In an embodiment where the make and model of the vehicle is known, the cargo placement plan can be specifically designed to fit the dimensions of a designated area of the vehicle (e.g., the vehicle's trunk) based on its specifications.

At 630, the compiled cargo is loaded into the storage apparatus of the loading robot. As stated above, the cargo can be placed into the storage apparatus in a way that facilitates the cargo placement plan designed for the vehicle to be loaded. For example, the cargo may be stacked in a last-in-first-out configuration so that the last piece of cargo stacked into the loading robot is the first piece of cargo placed in the vehicle. Again, the cargo may be loaded into the loading robot manually by human workers, or by other AGVs in a fully automated system.

After being loaded with the ordered cargo, the robot autonomously navigates to the vehicle at 640. In certain embodiments, the robot receives a signal (e.g. directly or indirectly via a server) from the vehicle to be loaded indicating the vehicle's location, such as a parking spot ID number or a geolocation indicator (e.g., RFID tag; internal GPS device). Upon arrival at 650, the loading robot can scan the designated vehicle to be loaded with an imaging sensor, as mentioned above. Based upon the scan of the area, the robot's processor at 660 can either confirm the predetermined cargo placement plan, or adjust the cargo configuration based on the presence of any obstacles within the area to be loaded. For example, if the predetermined placement plan was configured to fit cargo within a vehicle's empty trunk, but a scan of the trunk upon arrival indicates that there are already several boxes in the trunk, an adjusted cargo placement plan can be designed to configure the cargo around the existing boxes. The robot can also perform exception protocols if an adjusted cargo placement plan cannot be generated (e.g., not enough room). In such instances, a message could be sent to the mobile device 110 or a warehouse employee requesting manual intervention. A partial loading could be performed in some instances, or the loading could be aborted.

Next, at 670, the loading robot can scan fiducial marks on the cargo to be loaded to determine distinguishing features, as discussed previously, including manipulation points where the cargo should be handled during loading. Accounting for the information from the fiducial marks, the robot can then load the cargo into the vehicle at 680.

Figure 7:
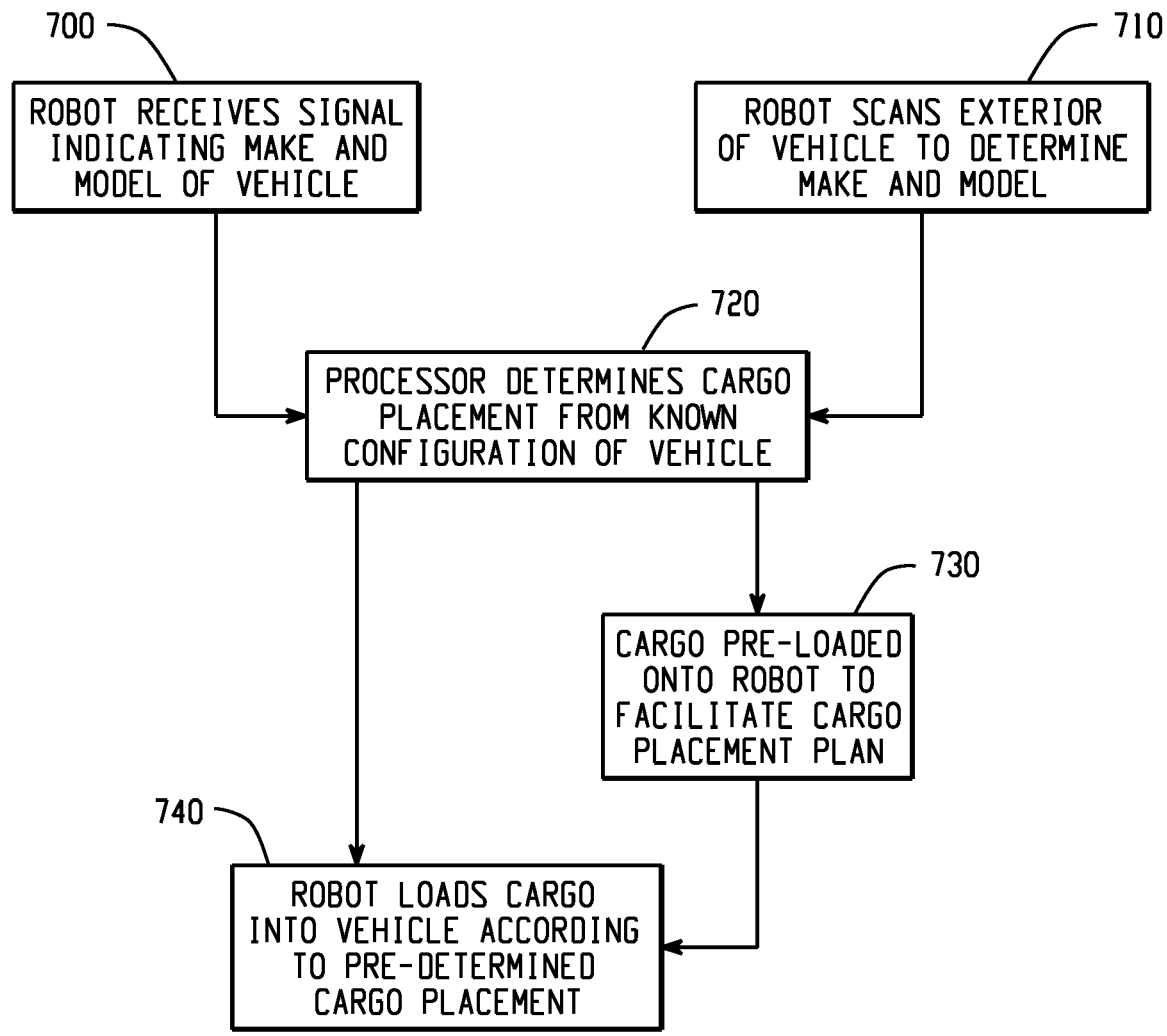
FIG. 7 illustrates an implementation of a method for predetermining a cargo placement plan for loading cargo into a vehicle.

FIG. 7 depicts an implementation of a method for predetermining a cargo placement plan for loading cargo into a vehicle. At 700, the loading robot receives a signal indicating the make and model of a vehicle, such as through the arrival information discussed in reference to FIG. 1 above. The processor can then determine a cargo placement plan at 720 from the known dimensions of the vehicle by running the loading algorithm previously discussed. The processor can be an internal device within the loading robot or external. In addition to confirm or alternatively at 710, the loading robot can use an imaging sensor to scan the exterior of the vehicle when it arrives to determine the make and model, and then run the loading algorithm if necessary to determine the cargo placement plan. In certain embodiments as represented at 730 and as described above, cargo can be pre-loaded into the storage apparatus of the loading robot in a way that facilitates the cargo placement plan designed for the vehicle to be loaded. Finally at 740, the robot loads the cargo into the vehicle according to the predetermined cargo placement plan.

Figure 8:
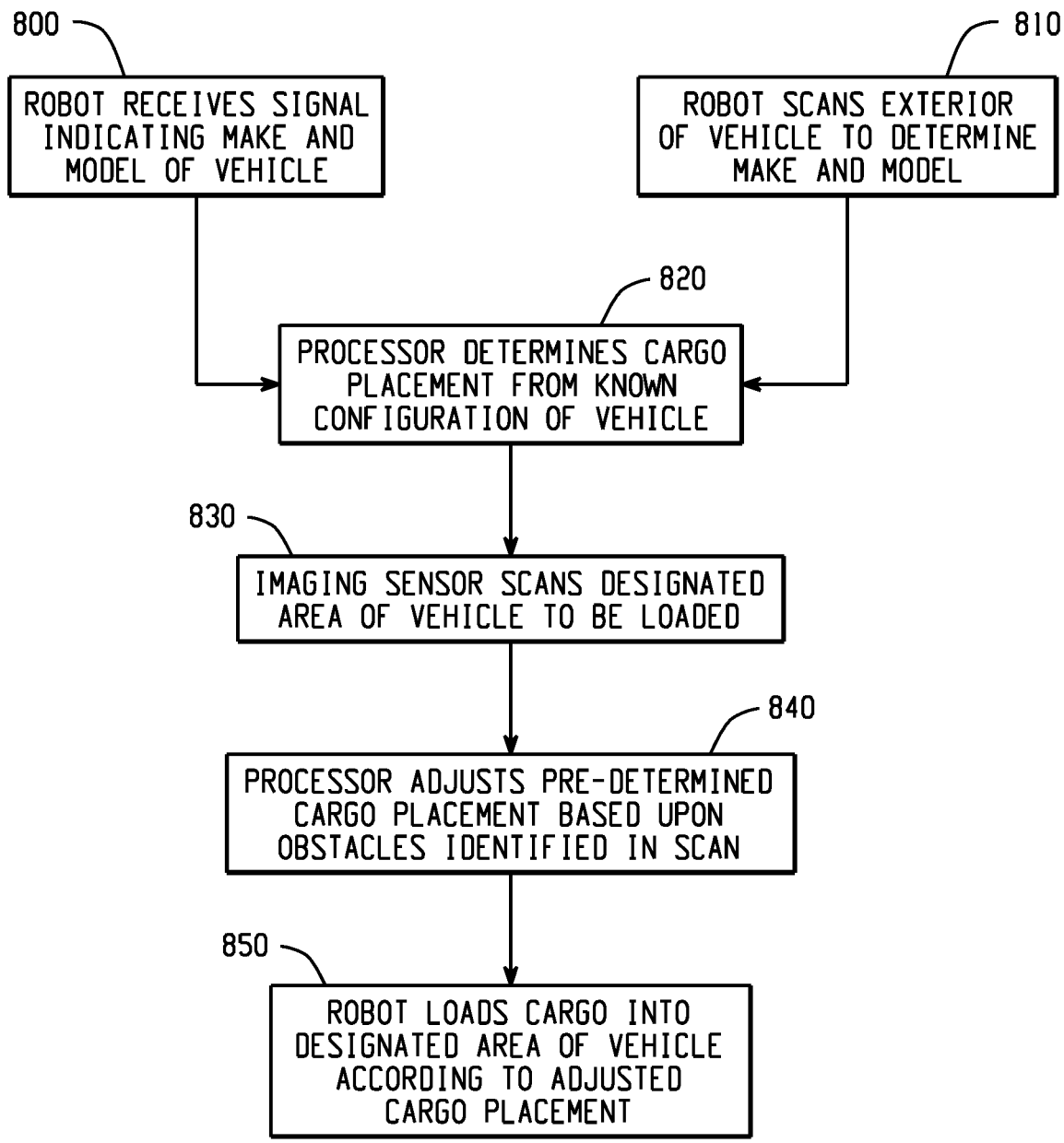
FIG. 8 illustrates an implementation of a method for adjusting a cargo placement plan based on a scan of the vehicle to be loaded.

FIG. 8 depicts an implementation of a method for adjusting the cargo placement plan of FIG. 7 based on a scan of the vehicle to be loaded. The processes described in 800, 810, and 820 echo those described in 700, 710, and 720 above, respectively. However, in the embodiment described in FIG. 8 at 830, when the loading robot arrives at the vehicle to be loaded, it can scan the area designated to receive the cargo for perceivable obstacles. Then at 840, the processor can adjust the predetermined cargo placement plan by running the loading algorithm again, this time taking into consideration any scanned obstacles in the designated area of the vehicle. For example, if the predetermined placement plan was configured for a vehicle's empty trunk, but a scan of the trunk upon arrival indicates that there are already several boxes within the trunk, an adjusted cargo placement plan can be designed to configure the cargo around the existing boxes. Accordingly, at 850 the loading robot can then load the cargo into the designated area of the vehicle based upon the adjusted cargo placement plan.

Figure 9:
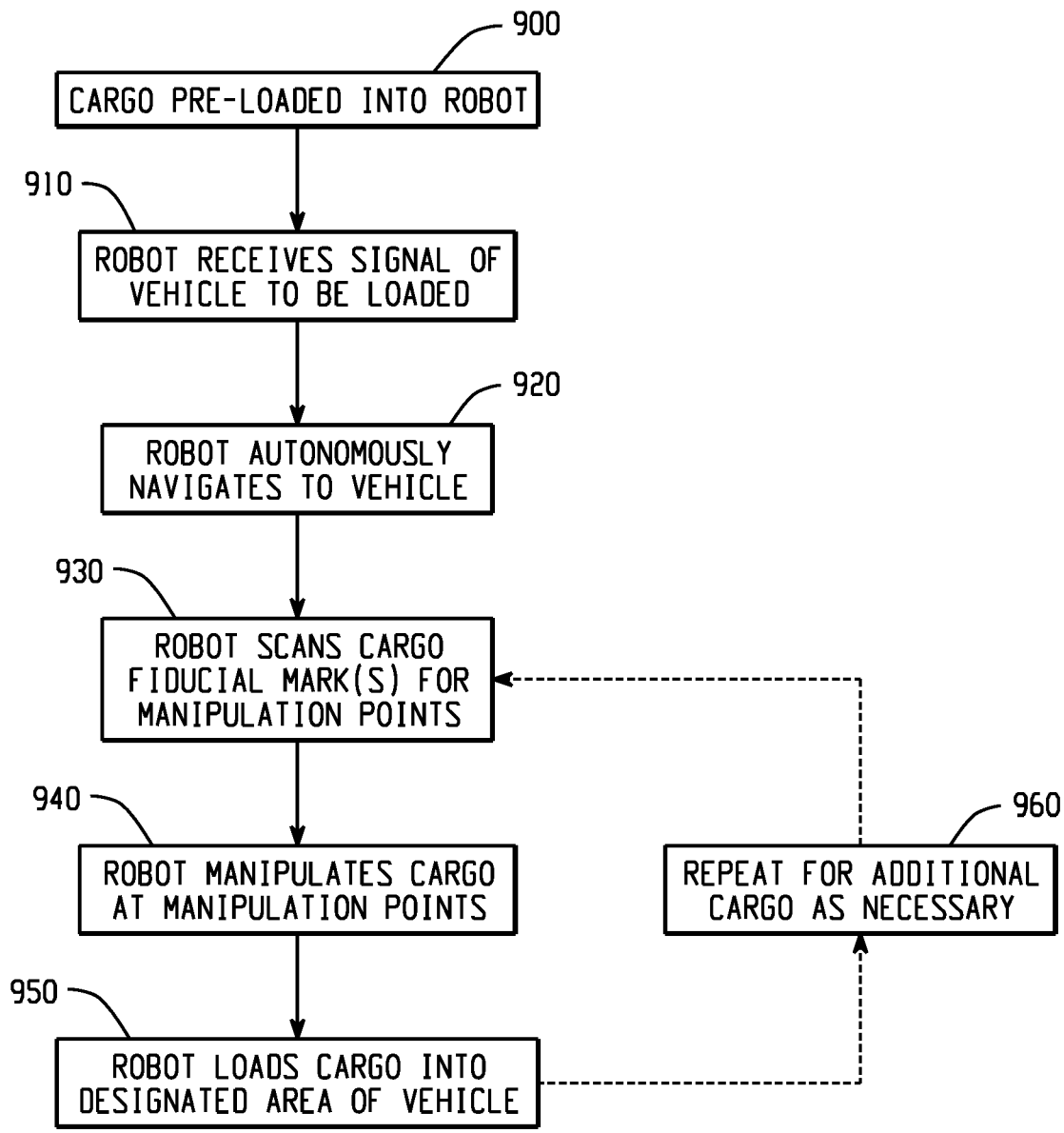
FIG. 9 illustrates an implementation of a method of loading cargo into a vehicle.

Referring now to FIG. 9, an implementation of a method of loading cargo into a vehicle is described. First, at 900, cargo is stacked into the storage apparatus of the autonomous mobile loading robot in a pre-loading configuration based on a predetermined loading configuration from a cargo placement plan. Next, at 910, the loading robot receives a signal indicating the location of the vehicle to be loaded. The loading robot then autonomously navigates to the location of the vehicle at 920. Then, at 930, the loading robot scans one or more fiducial marks located on a first piece of cargo in the storage apparatus with an imaging sensor, wherein the fiducial marks are configured to communicate one or more manipulation points of the first piece of cargo when scanned, as mentioned above. The robot then manipulates the first piece of cargo at the manipulation points with a manipulator, as described at 940. Lastly at 950, the robot loads the first piece of cargo into the designated area of the vehicle via the manipulator. If there is more than one piece of cargo to be loaded, the robot at 960 repeatedly scans and manipulates a next piece of cargo until the predetermined amount of cargo has been loaded into the designated area of the vehicle.

In some embodiments, the loading robot is configured to autonomously open the trunk of a vehicle prior to loading and/or close the trunk of the vehicle after loading is complete. If the make and model of the vehicle is known, the loading robot can access stored vehicle specifications regarding trunk configuration to determine how to open and/or close the trunk via the manipulator (e.g., multi-degree-of-freedom robot arm). Alternatively, or in addition, in some embodiments the loading robot can scan the exterior of the vehicle to determine a vehicle's make and model or to locate the opening device for the trunk. The manipulator can be configured to open or close a trunk by pressing a button, by lifting a handle, by turning a knob, by key, etc.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An autonomous mobile loading robot comprising:
   an autonomously guided vehicle platform configured to navigate to a location of a vehicle to be loaded with cargo and stack cargo in a pre-loading configuration based on a predetermined loading configuration;
   a storage apparatus configured to hold one or more pieces of cargo, wherein each piece of cargo is labeled with one or more fiducial marks configured to communicate distinguishing features of a piece of cargo when scanned;
   an imaging sensor;
   a processor configured to determine a cargo placement plan in a designated area of the vehicle, wherein cargo placement is based on dimensions of the area or any obstacles within the area; and
   a manipulator comprising a mechanism for loading cargo into positions in the designated area of the vehicle according to the cargo placement plan, wherein one or more manipulation points on each piece of cargo are determined from a scan of their respective fiducial marks by the imaging sensor.

2. The loading robot of claim 1, wherein the cargo placement within the designated area of the vehicle is determined based on a make and model of the vehicle to be loaded.

3. The loading robot of claim 1, wherein the cargo placement within the designated area of the vehicle is determined through a scan of the area with the imaging sensor.

4. The loading robot of claim 3, wherein the cargo placement is adjusted based upon obstacles in the designated area identified by the scan.

5. The loading robot of claim 1, wherein the manipulator further comprises a mechanism for gripping, transporting, and releasing cargo.

6. The loading robot of claim 1, wherein the manipulator further comprises touch sensors or proximity sensors, or both.

7. The loading robot of claim 1, wherein the manipulator is configured to autonomously open a trunk of the vehicle prior to loading, or autonomously close the trunk after loading is complete.

8. The loading robot of claim 1, wherein orientation of the cargo is determined from a scan of the fiducial marks.

9. The loading robot of claim 1, wherein weight of the cargo is determined from a scan of the fiducial marks.

10. The loading robot of claim 1, wherein contents of the cargo is determined from a scan of the fiducial marks.

11. The loading robot of claim 1, wherein fragility of the cargo is determined from a scan of the fiducial marks.

12. The loading robot of claim 1, wherein the cargo comprises one or more handles configured to be manipulated by the manipulator during loading.

13. The loading robot of claim 1, wherein the robot is configured to load one or more pieces of cargo into a single vehicle.

14. A method for loading cargo into vehicles comprising:
    stacking cargo into a storage apparatus of an autonomous mobile robot in a pre-loading configuration based on a predetermined loading configuration;
    receiving a signal indicating a location of the vehicle to be loaded with the cargo;
    autonomously navigating to the location of the vehicle;
    scanning one or more fiducial marks located on a first piece of cargo in the storage apparatus with an imaging sensor, wherein the fiducial marks are configured to communicate one or more manipulation points of the first piece of cargo when scanned;
    manipulating the first piece of cargo at the manipulation points with a manipulator;
    loading the first piece of cargo into the designated area of the vehicle via the manipulator; and
    repeatedly scanning and manipulating a next piece of cargo until a predetermined amount of cargo has been loaded into the designated area.

15. The method of claim 14, wherein the cargo is stacked in a last-in-first-out configuration so that a last piece of cargo stacked into the storage apparatus is the first piece of cargo loaded into the vehicle.

16. The method of claim 14, wherein the predetermined loading configuration within the designated area of the vehicle is determined based on a make and model of the vehicle to be loaded.

17. The method of claim 16, further comprising loading the cargo into predetermined positions in the designated area based upon the make and model of the vehicle.

18. The method of claim 14, further comprising adjusting the predetermined loading configuration based on a scan of the designated area with the imaging sensor.

19. The method of claim 18, further comprising loading the cargo into adjusted positions in the designated area based upon obstacles identified by the scan.

20. The method of claim 14, wherein the manipulator further comprises touch sensors or proximity sensors, or both.

21. The method of claim 14, further comprising autonomously opening a trunk of the vehicle with the manipulator prior to loading, or autonomously closing the trunk with the manipulator after loading is complete.

22. The method of claim 14, wherein the cargo comprises one or more handles configured to be manipulated by the manipulator during loading.

23. A system for loading cargo into vehicles comprising:
an autonomous mobile loading robot having:
  an autonomously guided vehicle platform configured to navigate to a location of a vehicle to be loaded with cargo and stack cargo in a pre-loading configuration based on a predetermined loading configuration;
  a storage apparatus configured to hold one or more pieces of cargo;
  an imaging sensor;
  a processor configured to determine a cargo placement plan in a designated area of the vehicle, wherein cargo placement is based on the dimensions of the area or any obstacles within the area;
  a manipulator comprising a mechanism for manipulating cargo into positions in the designated area according to the cargo placement plan; and
a machine for loading one or more pieces of cargo having one or more fiducial marks, wherein the fiducial marks are configured to communicate distinguishing features of the cargo to the loading robot when scanned by the imaging sensor, including one or more manipulation points for the manipulator.

* * * * *